R. J. S. GRAHAM.
Buckle.

No. 203,029. Patented April 30, 1878.

WITNESSES:
C. Neveux
C. Sedgwick

INVENTOR:
R. J. S. Graham
BY
ATTORNEYS.

UNITED STATES PATENT OFFICE.

ROBERT J. S. GRAHAM, OF BROOKLYN, ASSIGNOR TO HIMSELF AND MILES J. CONNER, OF NEW YORK, N. Y.

IMPROVEMENT IN BUCKLES.

Specification forming part of Letters Patent No. 203,029, dated April 30, 1878; application filed March 13, 1878.

*To all whom it may concern:*

Figure 1:
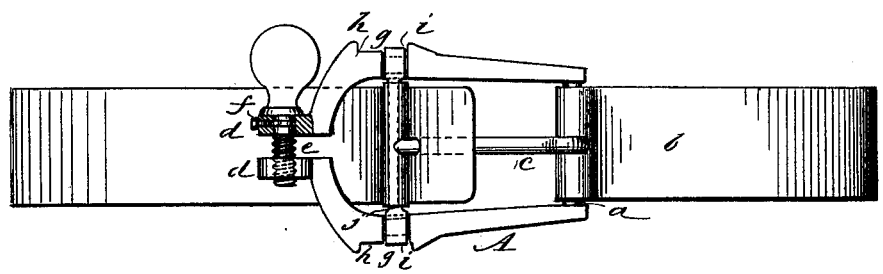
Figure 2:
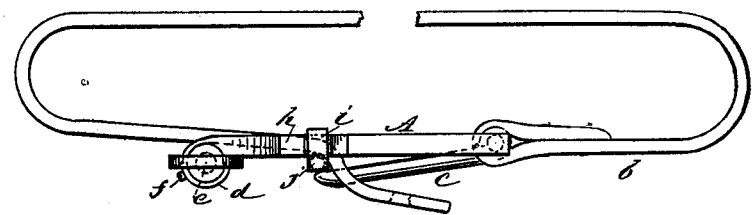

Be it known that I, ROBERT J. S. GRAHAM, of Brooklyn, in the county of Kings and State of New York, have invented a new and Improved Buckle, of which the following is a specification:

Figure 1 is a front elevation of my improved buckle. Fig. 2 is a side view of the same.

Similar letters of reference indicate corresponding parts.

The object of my invention is to provide a buckle for harness that may be disengaged from the strap or trace in connection with which it is used without the necessity of drawing upon the strap or trace to release the buckle-tongue.

The invention consists in a buckle having an open frame, which may be drawn together or spread apart by an adjusting-screw, and having a movable bar that hooks over the sides of the frame and rests in notches formed in the sides of the frame when the buckle is in use, but which may be released from the notches, so as to liberate the buckle-tongue, by turning the adjusting-screw.

Referring to the drawing, A is the frame of the buckle, having the bar $a$ for receiving the strap $b$ and buckle-tongue $c$. The outer end of the buckle is open, and provided with ears $d$. An adjusting thumb-screw, $e$, passes through one of the ears $d$ into the other ear, which is threaded to receive it. The shank of the screw is grooved circumferentially, and a small screw, $f$, passes through the edge of the ear and projects into the groove in the screw-shank. In each side of the buckle-frame there is a notch, $g$, having a shallow portion, $h$, and a deeper portion, $i$. The bar $j$, upon which the free end of the buckle-tongue $c$ rests, is flattened at its ends and hooked or bent over the sides of the buckle-frame.

When the buckle is in use the hooks on the bar $j$ rest in the deeper portion $i$ of the notch in the side of the buckle-frame, the said frame being expanded by means of the adjusting-screw $e$.

When the horse falls, and it is desired to detach the horse from the vehicle, or to remove the harness from the horse, the screw $e$ is turned, bringing the sides of the frame A nearer together, so as to allow one or both ends of bars $j$ to slip from the deeper to the shallower portion of the notch $g$. The tongue $c$, being now without support, is drawn through the frame, and the strap or trace slips from it.

This improvement is especially useful in artillery-harness, as it is often required to detach a killed or wounded horse to save a battery, which might otherwise be lost.

It is also useful in harness worn by dray and omnibus horses, as it admits of a speedy release of the horse without injury to the harness.

Having thus described my invention, I claim as new and desire to secure by Letters Patent—

1. A buckle having a movable tongue-rest bar, substantially as and for the purpose specified.

2. A buckle having its outer end open, its side bars notched to receive a movable cross-bar, and provided with an adjusting-screw, all substantially as and for the purpose set forth.

ROBERT J. S. GRAHAM.

Witnesses:
   GEO. M. HOPKINS,
   C. SEDGWICK.